Nov. 30, 1954 J. E. VISTAIN, JR 2,695,786

PHONOGRAPH RECORD CHANGER

Filed Oct. 21, 1948 7 Sheets-Sheet 1

INVENTOR.
James E. Vistain Jr.
BY
J. D. Douglas
Atty.

INVENTOR.

James E. Vistain Jr.

BY

J. D. Douglas

Att'y.

INVENTOR.
James E. Vistain Jr.
BY
J. D. Douglass
Att'y.

Nov. 30, 1954 J. E. VISTAIN, JR 2,695,786

PHONOGRAPH RECORD CHANGER

Filed Oct. 21, 1948 7 Sheets-Sheet 4

INVENTOR.
James E. Vistain Jr.
BY
J. D. Douglas
Att'y.

INVENTOR.
James E. Vistain Jr.
BY
J. D. Douglas
Att'y.

INVENTOR.
James E. Vistain Jr.
BY
J. D. Douglas
Att'y.

INVENTOR.
James E. Vistain Jr.
BY
J. D. Douglas
Att'y.

2,695,786
Patented Nov. 30, 1954

2,695,786

PHONOGRAPH RECORD CHANGER

James E. Vistain, Jr., Chicago, Ill., assignor to Admiral Corporation, Chicago, Ill., a corporation of Delaware Application October 21, 1948, Serial No. 55,801
17 Claims. (Cl. 274—10)

This invention relates to new and useful improvements in phonograph record player mechanisms and more particularly to a record changer of the type where the records are disposed in a stack above the turntable and discharged successively one at a time onto the turntable.

Among the improvements which are incorporated in the present invention are those which afford ease of control for the record player, convenience of repair or adjustment and which provides for economy of manufacture.

Other advantages of the invention will be set forth in part hereinafter and in part will be obvious herefrom, or may be learned by practice with the invention, the same being realized and attained by means of the instrumentalities and combinations pointed out in the appended claims.

The accompanying drawings, referred to herein and constituting a part hereof, illustrate one embodiment of the invention and together with the description, serve to explain the principles of the invention.

Figures 1, 2, 3, 4, 5, 6:
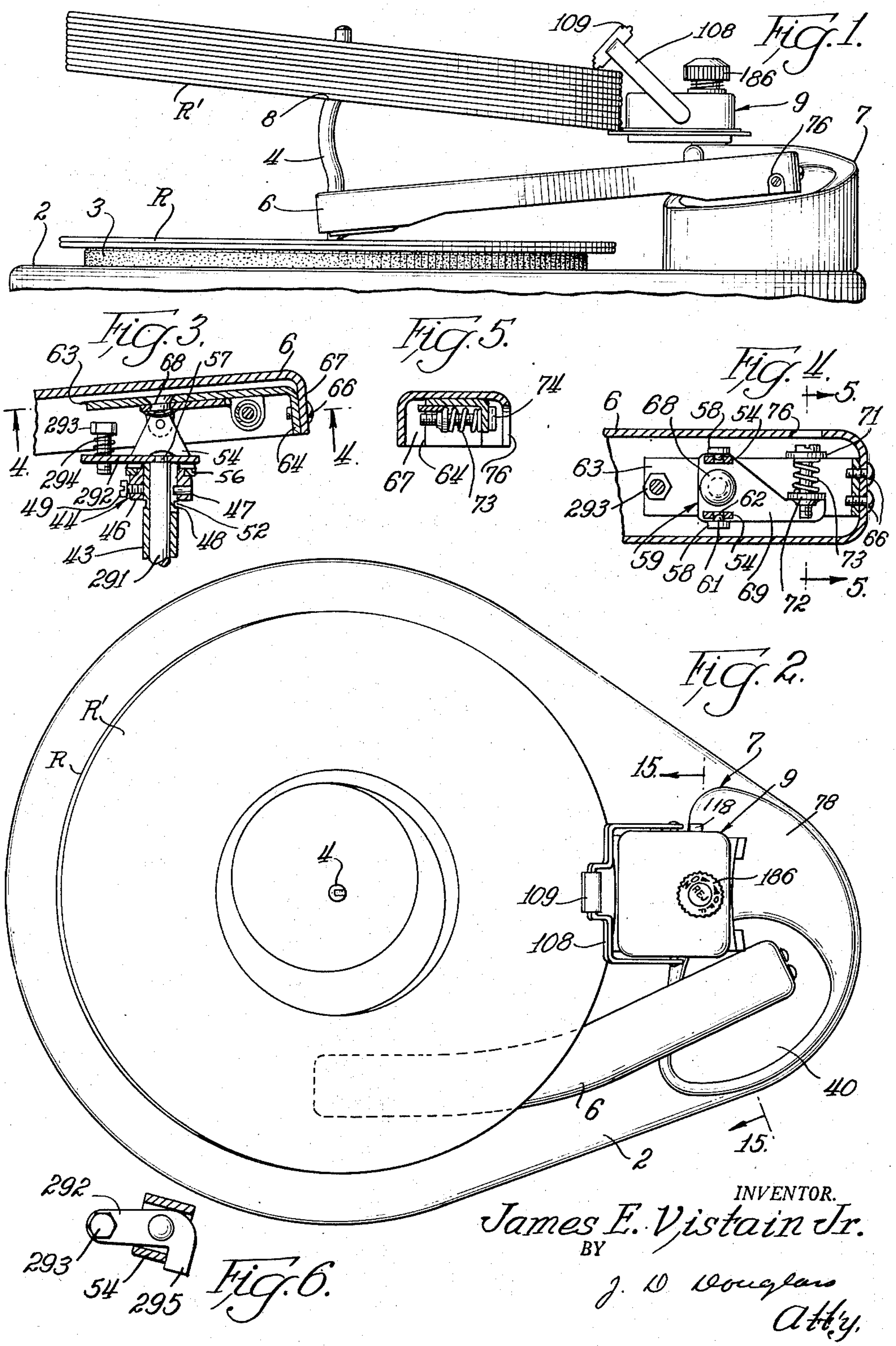
Fig. 1 is a view of the invention in side elevation, the lower portion being broken away.
Fig. 2 is a top plan view of the mechanism shown in Fig. 1.
Fig. 3 is a full size fragmentary view of the pickup arm support mechanism in vertical elevation, the parts being broken away to reveal the structure of underlying parts.
Fig. 4 is a transverse section taken on line 4—4 of Fig. 3.
Fig. 5 is a vertical section taken substantially on line 5—5 of Fig. 4.
Fig. 6 is a top plan view of means for controlling the pickup arm including the bifurcated support member, partly in section.

In the drawings, wherein for the purpose of illustration, is shown one embodiment of my improved record player, the reference character 2 is used to denote a base plate or frame on which is rotatably supported a conventional turntable 3. The center holes of records R are adapted to be threaded over a fixed spindle 4 extending axially of the turntable so that the records are operably associated with the turntable while engaged by a pickup arm 6 one end of which is supported from the base plate 2 by means including a bearing member 7. Toward the upper end thereof, the spindle 4 has a shoulder 8 adapted to provide support for a stack of records R′, at their center holes, while an ejector head 9, carried by the bearing member 7, provides support for the stack of records at their peripheral edges, the spindle and ejector head thus collectively providing a magazine for the records R′ in elevated position above the level of the pickup arm 6.

The contour of the base plate 2 may be oval in formation (Fig. 2). It is provided with a flange 11 (Fig. 23) extending downwardly throughout the length of its edge from a horizontal wall 12. The plate 2 also includes an offset wall 13 (Fig. 10) which is spaced at a lower level from the wall 12 by a circular wall 14, thereby providing a well or depression 16 adapted to accommodate the turntable 3, the latter including a depending skirt portion 17 at the periphery thereof. It will be appreciated that the base plate may be square or other shape if desired.

The turntable 3 is supported in rotatable relationship to the base plate 2 by means including a socket member 18 (Fig. 10) suitably connected to the offset wall 13 at an aperture 19 therein. The turntable 3 includes an axial downwardly extending hub 21 which is journalled on a sleeve portion 22 of the socket member 18. About the portion 22 the socket member is provided with an annular groove or recess 23 adapted to receive a conventional ball thrust bearing 24 which is sandwiched between vibration insulating washers 26. The weight of the turntable is therefore carried by the ball bearing 24 while the sleeve 22 resists lateral displacement of the turntable. If desired, a bearing bushing 27, frictionally or otherwise suitably held in the hub 21 may be employed to provide journalled relationship between the turntable and sleeve 22. Owing to the construction, as outlined, it is an easy matter to remove the turntable from assembly with the other mechanism by lifting the turntable upwardly.

Figures 7, 8, 9:
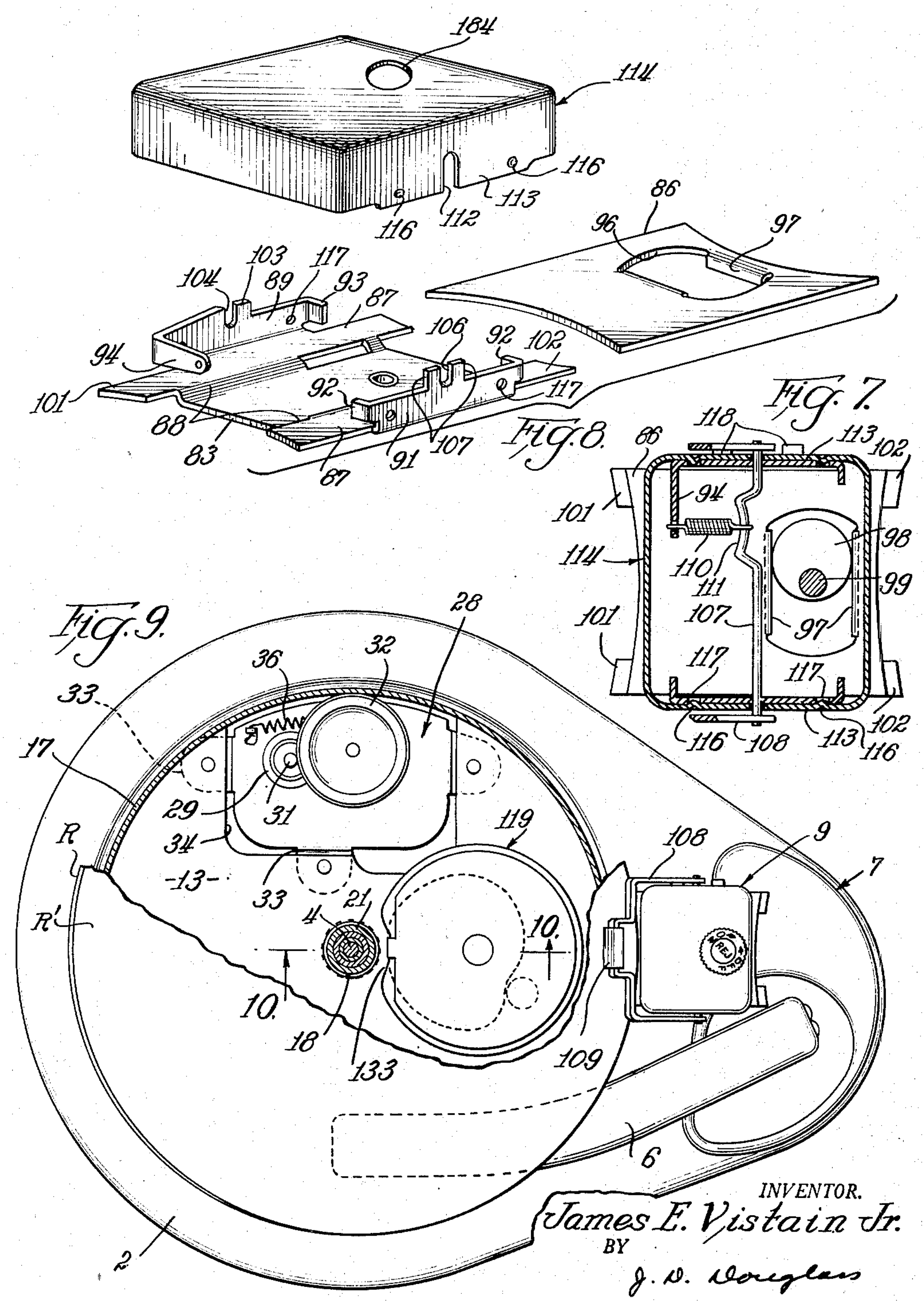
Fig. 7 is a full size view, of the ejector head, corresponding to Fig. 2 but with the top part broken away to reveal the structure of parts otherwise hidden from view.
Fig. 8 is an exploded view of three of the principal parts of the ejector head in perspective.
Fig. 9 is a view similar to Fig. 2 with certain parts being broken away to reveal the structure of other parts.

Provision for constantly driving the turntable 3 includes a motor unit 28 (Fig. 9) which will not be described in detail since it forms the subject matter of a copending application filed on November 26, 1945 in the name of George Redfield, Ser. No. 630,709, now U. S. Patent 2,479,512. In view of this, however, it may be timely to state that the unit includes a motor 29 having a drive shaft 31 and a rubber tired wheel 32 adapted to be swung around the shaft, with which it is in constant, frictional driving communication. The unit also includes a plurality of arms 33 by which it is supported from the offset wall 13 below an aperture 34 therein. Rubber bushings, not shown, further segregate vibration created by the motor from other parts of the machine, the bushings being between the ends of the arms 33 and the wall 13. The unit 28 is so positioned with respect to the vertical skirt-portion 17 of the turntable 3 that force of a spring 36 is adapted to normally urge the wheel 32 into driving communication with said skirt portion and the motor shaft.

As has previously been indicated, the pickup arm 6 is supported from the bearing member 7. To effectively provide this support the bearing member is substantially semicircular in transverse cross-section; furthermore, it is preferably constructed of some rigid plastic material such as Bakelite. As a convenient means for rigidly connecting the member 7 (Fig. 15) to the plate 2, screws 37 passing through said plate and threaded in bosses 38 and 39 which are integral with the bearing member, are employed. Eccentrically thereof, the member 7 includes a horizontal top wall 40 from which a boss 41 extends downwardly through an opening in the base plates, and in which a tubular insert or bushing 42 is rigidly disposed. In the bushing 42 is journaled a tubular shaft 43 the upper end of which carries a tone arm support member 44 (Fig. 3) which includes a collar 46. Driving relationship of the collar 46 to the shaft 43 is provided by a pin 47, carried by the collar 46, and extending into a slot 48, extending downwardly from the upper end of shaft 43, to secure the collar against rotation with respect to the shaft while a set screw 49, threaded in the collar, is adapted to lock the collar on the shaft after it has been slid to the desired position. The shaft 43 is further restrained against downward displacement with respect to the bushing 42 (Fig. 15) by a U-shaped washer 51 which, by virtue of its resiliency, is adapted to pinch the shaft 43 at an annular groove 52 therein. If desired, a spring washer 53, normally arcuate in axial section, may be used on the shaft 43 between the bushing 42 and U-shaped washer 51 to cushion the support for the pickup arm.

The member 44 has a pair of spaced-apart arms 54 extending upwardly from the collar 46. The arms may be integral with a base 56 through which a section 57, of reduced diameter, of the collar 46 extends for rigid connection with the member 56, preferably by upsetting the end of the section 57. The arms 54 are embraced by a pair of downwardly extendnig arms 58 of a second member 59 which is connected to the pickup arm by means to be presently described. The arms 58 each include pivotal members 61 extending toward each other and into oppositely disposed holes 62 in the ends of the arms 54, thereby providing a horizontal axis about which the pickup arm may rock.

Provision is made to adjustably swing the pickup arm 6 with respect to the support member. Said means includes a bracket or bracket member 63 which is L-shaped in longitudinal vertical section thus including a downwardly bent end portion 64. As one convenient manner by which the bracket 63 is adapted to be coupled to the pickup arm 6, a pair of screws 66 pass through an end wall 67 of the pickup arm and are threaded in the end portion 64 of the bracket member. The bracket 63 is thus cantilevered from the end wall 67 to provide room for one end of a rivet 68 by which the second support member 59 is pivoted to the bracket member 63. The second member 59 has an adjustment arm 69 extending toward the end wall 67. Also the bracket member 63 includes a downwardly extending ear 71 while opposite thereto the arm 69 also includes a downwardly extending ear 72 which is adapted to be pressed away from the ear 71 by a compression spring 73. Means to support and confine the spring 73 between the ears includes an adjustment screw 74 which extends through the ear 71, spring 73 and is threaded in the ear 72. Additionally, a side wall of the pickup arm 6 is provided with a notch 76 so that therethrough a screw driver may be inserted to operatively engage the screw 74.

It will therefore be apparent that by my novel adjustment, provided by the screw 74 and spring 73 I am able to compensate for wear of the record player parts or irregularities in the position of the arm at the beginning of the sound grooves of records so that the pickup arm of the record player is adapted to be effectively lowered, automatically, into initial engagement with the beginning of the sound groove of a record when on the turntable 3.

Figure 15:
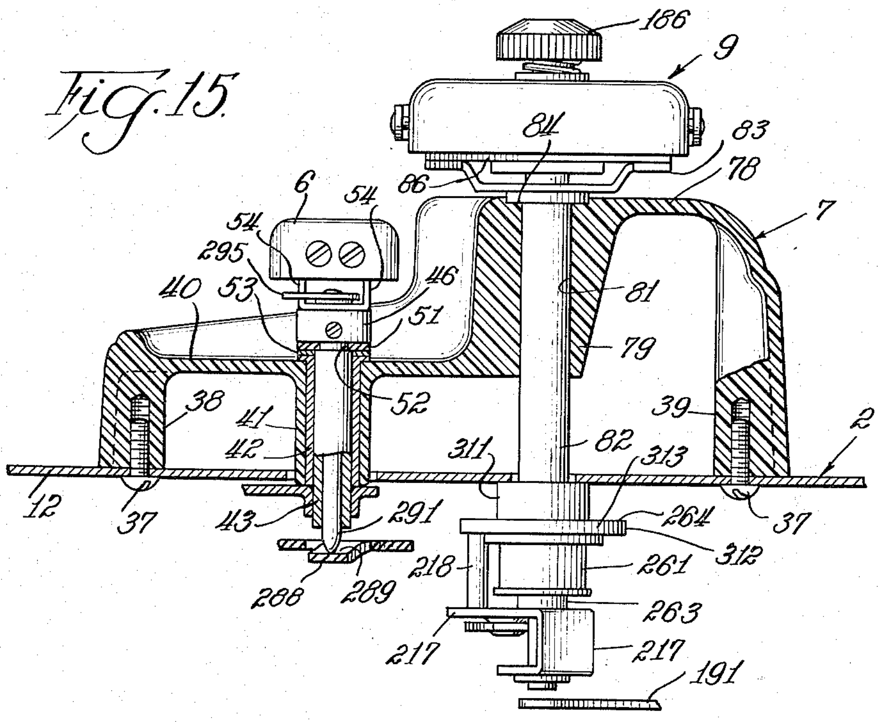
Fig. 15 is a vertical section taken on line 15—15 of Fig. 2.

The ejector head 9 is also supported from the bearing member 7 (Fig. 15). To provide for this the member 7 includes a horizontal wall 78 disposed at a higher level than the wall 40. From the horizontal wall 78 a boss 79 extends downwardly and includes therein a bore 81 in which a sleeve 82 is journalled. The ejector head 9 includes a horizontal support plate 83 (Fig. 8) which is rectangular in general formation, rigidly coupled to the sleeve 82 and also preferably spaced from the top wall 78 by a bearing washer 84. Furthermore, the sleeve 82 is attached to the plate 83 (Fig. 15) at a point nearer to one end thereof than the other by a difference adequate to compensate for the difference between the radius of a 10-inch and a 12-inch record so that regardless of which sized record is threaded over the spindle

4 the support plate is adapted to provide operative support for that record at its peripheral edge when turned with the appropriate end of the support plate toward the spindle.

Associated with the support plate 83 (Fig. 8) is a push plate 86 adapted to be slid longitudinally of the support plate by means to be described hereinafter. Horizontal bearing surfaces 87 extend along either of the long sides of plate 83, the bearing surfaces being provided by offsets 88. The push plate 86 is also of generally rectangular formation and as will be noted (Fig. 7) is substantially the same width as the plate 83. The push plate is confined against lateral displacement by means including side flanges 89 and 91 extending upwardly from the sides of the support plate 83. The push plate is further confined against displacement upwardly by lugs 92 bent inwardly from either end of the flange 91 and in extension over the push plate 86, in addition to a similar lug 93 and an arm 94 in extension toward the lugs 92 from either end of flange 89 over the push plate.

In order that the push plate 86 may be oscillated with respect to the suport plate 83 said push plate is provided with an aperture 96 toward one end thereof. From opposite sides of the aperture 96, and transversely of the course that the push plate is adapted to be moved through, a pair of flanges 97 extend downwardly. The flanges 97 are spaced apart by a distance equal to the diameter of an eccentric member 98 rigidly carried by a crank rod 99 (Fig. 18) which is journalled in the sleeve 82. The eccentric member 98 being supported between the flanges 97, is therefore adapted to move the push plate 86 over the plate 83 whenever the rod 99 is rotated.

As will be noted (Figs. 7 and 8) the support plate 83 is recessed at either end thereof to provide fingers 101 and 102 the tips of which are substantially arcuate of the periphery of a record when carried by the spindle. The push plate 86 is materially shorter than the support plate, it also having ends substantially arcuate of the periphery of a record so as to effectively engage the periphery of the bottom-most record of a stack supported by the fingers 101 and 102 and dislodge it from the support of said fingers without disturbing the remaining records of the stack.

Hold-down means are provided to press the records against the fingers 101 and 102 as a safeguard against rocking of the records about their support on the spindle 4 and consequent failure of release from the magazine. For this precaution the flange 89, by a continuation of its side and an ear 103 thereon, provides a notch 104 while opposite thereto another notch 106 is provided between ears 107 extending upwardly from the flange 91. The notches 104 and 106 are adapted to receive a shaft 107 to the ends of which are rigidly fastened the respective ends of a substantially U-shaped member or hold-down arm 108 the center of which is embraced by a record contactor member 109 of some suitable resilient material such as rubber. The shaft 107 includes a crank-portion 111 between which and the arm 94 a tension spring 110 is anchored to bias the record contactor member 109 against a record or records supported by either the fingers 101 or fingers 102. The shaft 107 is further confined within the notches 104 and 106 by complementary notches 112 in opposed side walls 113 of a cover 114. The walls 113 are adapted to embrace the flanges 89 and 91 in fixed relationship with which they are secured by distentions or dimples 116 on the walls 113, the dimples being pressed into holes 117 in the flanges 89 and 91 by the comparative resiliency of the cover 114.

One of the walls 113 is provided with stops 118 struck outwardly therefrom to arrest the downward urge of the U-shaped member 108.

Clutch means is provided between the driven turntable and mechanism adapted to be intermittently driven through a cycle of operation from the turntable to manipulate the pickup arm and sequentially operate the ejector mechanism when a record is to be changed. In greater detail the hub 21 (Fig. 10) is adapted to drivingly engage a mutilated friction wheel or pulley indicated in its entirety by the reference character 119. For this operation the surface of the hub 21 is preferably knurled while the wheel 119 includes a rubber tire 121. For operative association of the wheel 119 with the hub, said wheel is supported indirectly from the offset wall 13 of the base plate 12 by mechanism later to be described.

Figure 12:
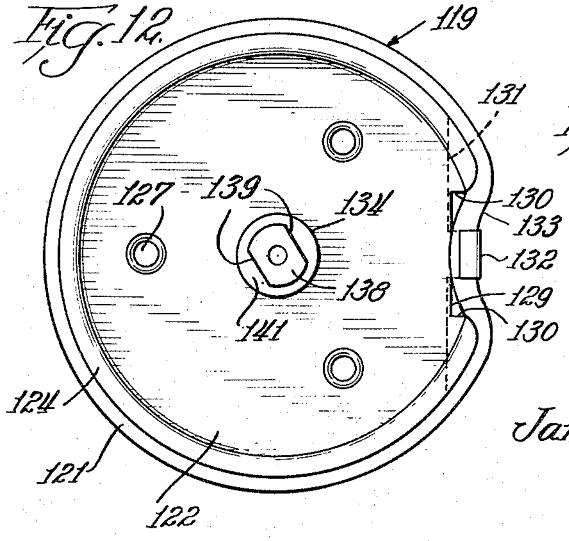
Fig. 12 is bottom plan view of the friction wheel, and shaft connected thereto, disassociated from the remainder of the mechanism.

A preferred construction for the wheel involves use of a lower disc 122 (Fig. 10) which has, extending laterally for the most part of its periphery, a skirt 123 from which a circumferential flange 124 extends for the greater part of the disc. An upper disc 126, rigidly attached to the disc 122 in some suitable manner such as by rivets 127, has a diameter substantially equal to the diameter of the flanged portion 124 of the disc 122. A groove 128 at the edges of the discs is thus provided which is adapted to receive the tire 121. Uniformity of the peripheral region of the disc 122 is broken by a notch 129 which includes spaced-apart parallel edges 130. Above the notch 129 the periphery of the disc 126 is broken by a cut-away straight portion 131 (Fig. 12) from which a finger 132 extends. The finger 132 is bent downwardly and backwardly thus providing a hook behind which the tire 121 extends so that a notch 133 is defined by the inwardly extending tire 121. Consequently, when driving engagement of the wheel 119 and hub 21 is established, the wheel 119 is adapted to rotate only until the notch 133 is adjacent the hub 21 at which time the hub is in spaced relationship to the wheel 119.

Figures 13, 14:
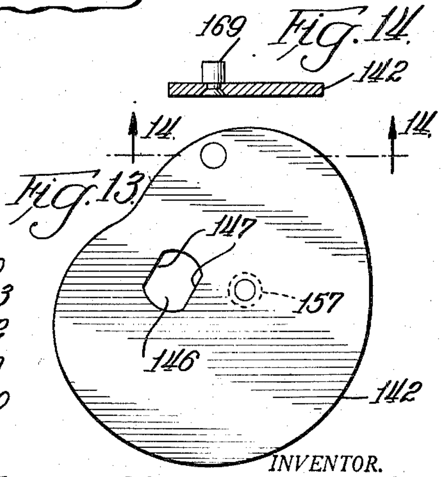
Fig. 13 is a plan view of the drive cam.
Fig. 14 is a section on line 14—14 of Fig. 13.

In order that the wheel 119 may be supported so that it is adapted to be drivingly associated with the hub 21, a sub shaft 134 is employed. An end portion 135 of the shaft 134 is of reduced diameter, so that the stub shaft may be rigidly attached to the discs 122 and 126 by upsetting the end of the portion 135 against the disc 126. The shaft 134 is journalled in a bearing 136 against which the disc 122 of the wheel is adapted to rest. Provision for lateral motion of the bearing 136 includes an aperture 137, in the plate 13, through which the bearing extends. On its lower extremity, Fig. 12, a section of the shaft 134 is of reduced diameter and terminates in an extension 138 which is provided with opposed lateral flat surfaces 139 thereon. A shoulder 141 is thus provided against which a rotary cam 142 is clamped by means of a screw 143 and washer 144, an aperture 146 (Fig. 13) in the cam 142 including flat surfaces 147 adapted to register with the flats 139 on the extension 138. The pulley 119 is thereby rigidly coupled to the cam 142.

Figures 10, 11, 22:
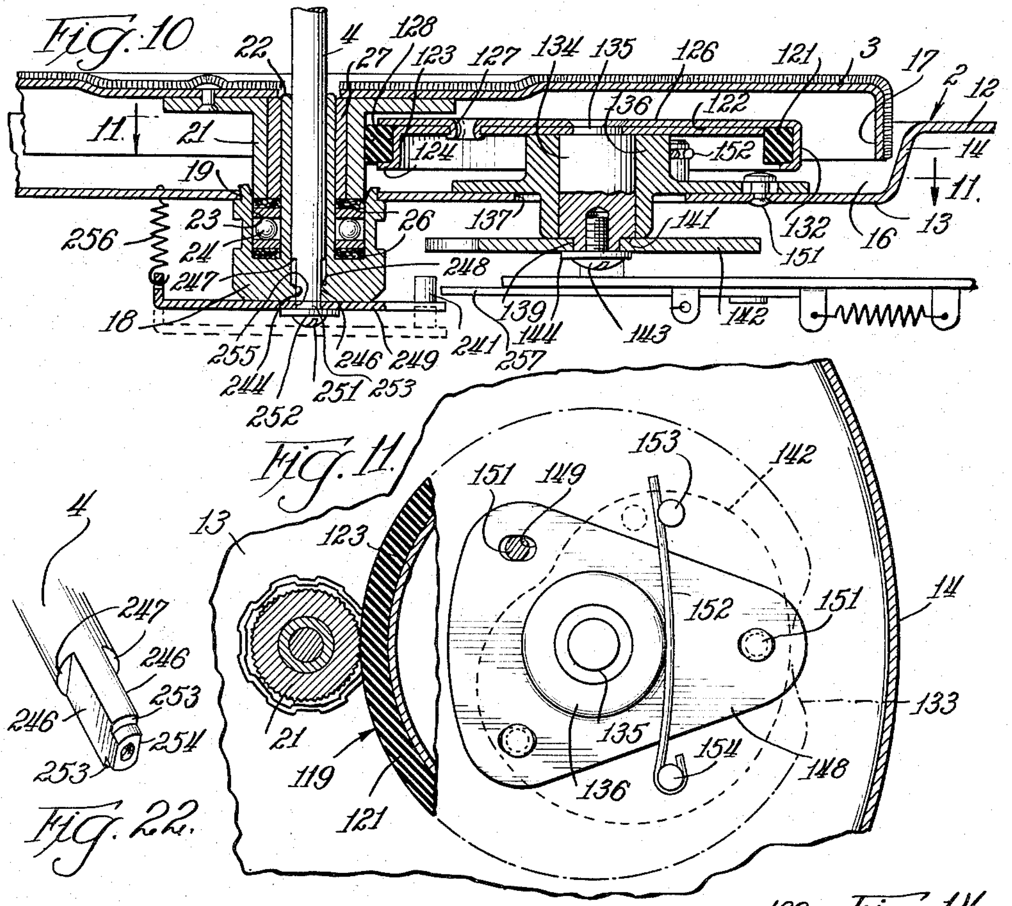
Fig. 10 is an enlarged fragmentary vertical section, taken on line 10—10 of Fig. 9.
Fig. 11 is a fragmentary transverse section taken approximately on line 11—11 of Fig. 10.
Fig. 22 is a fragmentary view, in perspective, showing the lower end of the spindle.

The wheel 119 is movably anchored to the wall 13. To provide for this, the bearing 136 includes a laterally extending flange 148 which is generally triangular in formation (Fig. 11). Each of the corners of the flange 148 has a slot 149 therein in which is received a headed pin 151 extending upwardly from the wall 13. The wheel 119 is thus movable toward and away from the hub 21 to an extent limited by the slots 149 and pins 151. A resilient wire or rod 152, conveniently anchored to the wall 13 as by studs 153 and 154, extends over the flange 148 and by pressing against the bearing 136 cushions the driving communication between the wheel 119 and the hub 21.

From the position occupied by the wheel 119 while a record is being played (Fig. 9) the wheel is normally urged counterclockwise. This is effected by a tension spring 156 (Fig. 23) anchored to the cam 142 by a crank pin 157 carried by said cam. But this urge to rotate is resisted by mechanism, to be later described, and which thereby retains the wheel positioned with the notch 133 opposite the hub 21. However, when a record is rejected the mechanism last referred to releases the wheel and the spring 156 turns the cam and the wheel 119 about its axis sufficiently so that the peripheral surface of the wheel is swung into driving communication with the hub 21.

Figures 16, 17, 18, 19:
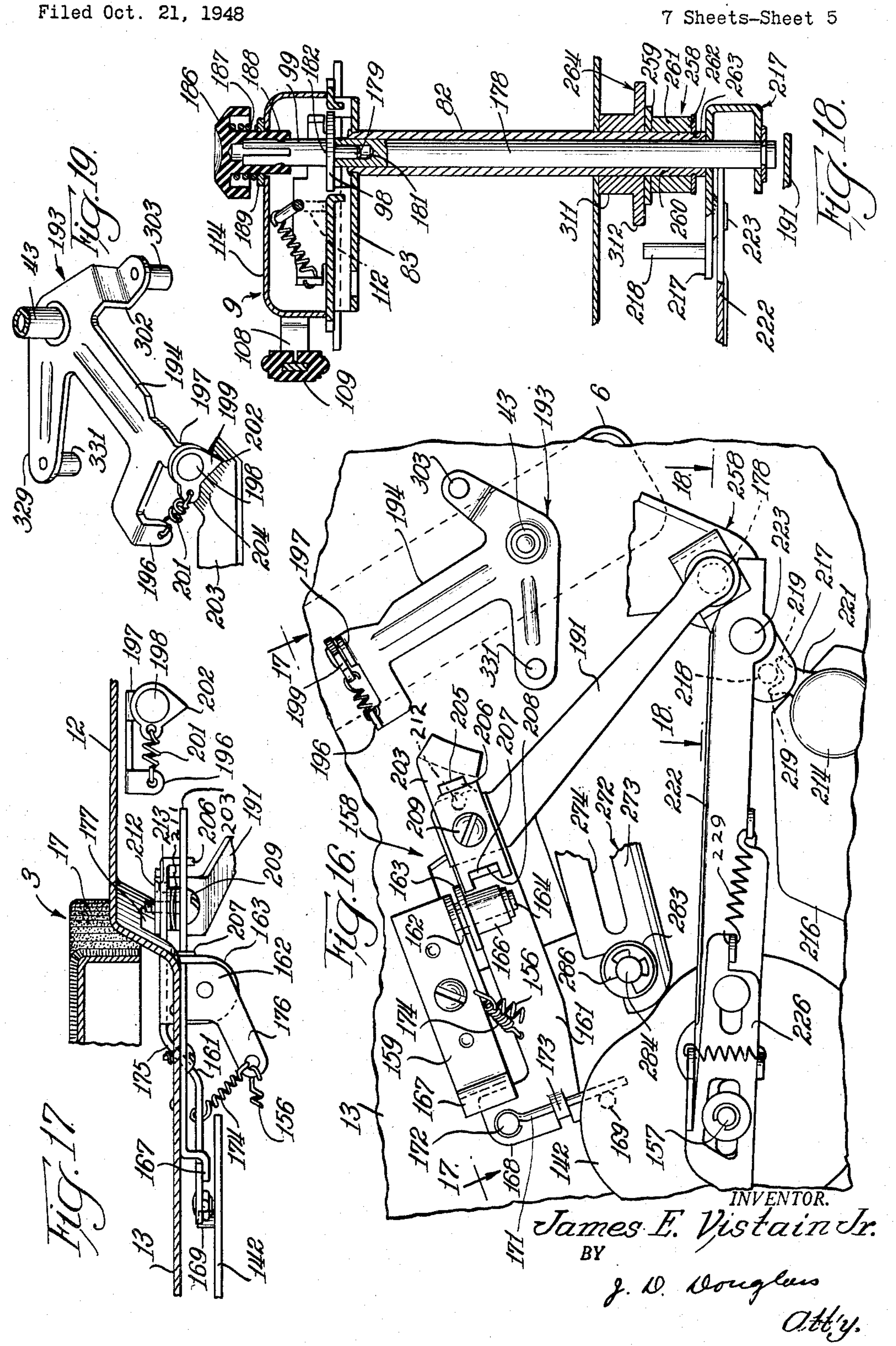
Fig. 16 is a fragmentary bottom plan view of mechanism for starting a record changing cycle.
Fig. 17 is a fragmentary section taken on line 17—17 of Fig. 16.
Fig. 18 is a vertical section on line 18—18 of Fig. 16.
Fig. 19 is a perspective view of the spider mechanism including the pawl, in engagement with the ratchet on a portion of the trigger arm.

Rotation of the cam 142 to turn the wheel 119 into driving engagement with the hub 21 is delayed by a trigger mechanism referred to in its entirety by the character 158 (Fig. 16). Said mechanism includes a bracket member 159, rigidly secured to the wall 13, and pivotally supports a latch or lever 161. The bracket member 159 has an arm 162 extending downward vertically which supports a stud 164. The pivoted member 161 also includes an arm 163 extending downward and carries a bushing 166 which is disposed on the stud 164. At one end thereof, the bracket 159 is offset at 167 in spaced relation to the wall 13 to provide therewith limits between which the lever 161 is adapted to swing, said lever having an arm portion 168 extending between the offset portion 167, of the bracket, and wall 13. In order that the lever 161 may obstruct rotation of the wheel 119 and maintain the notch 133 adjacent the hub 21 throughout the duration of reproducing a record, the cam 142 is provided with a pin 169 extending vertically of its upper surface which pin is adapted to engage against a finger 171 on the lever 161. Preferably the finger 171 may take the form of a wire or rod twisted about a rivet 172 and caught beneath a hook 173 struck from the lever 161. The lever 161 and its finger 171 is biased toward the cam 142 by any suitable means such as a tension spring 174 anchored between the lever 161 and an extension 176 of the arm 162. When the lever 161 is rocked clockwise, (Fig. 17) against the resistance of spring 174, the finger 171 is rocked out of engagement with pin 169. Thereupon, spring 156 moves the cam and the notch 133 in the friction wheel away from the hub 21 of the turntable to provide driving relationship between the wheel 119 and the hub. The cam 142 is then driven substantially through a complete revolution before the completion of which lever 161 is returned to its former and normal position by the spring 174 so that the rotation of cam 142 is adapted to be arrested by engagement of the pin 169 by the finger 171, a cycle of operation of the cam then having been completed.

As will be noted, (Fig. 17) the lever 161 is provided with an offset at 175. This is for a purpose to be apparent hereinafter. Accordingly, the wall 13 is provided with an aperture 177 in which a portion of the lever 161 is accommodated.

The pivoted member 161 is adapted to be rocked manually by a button on the ejector head 9 to reject a record at any time during the course of its reproduction. Means by which this is effected includes a crank rod 178 (Fig. 18) slidably journalled in the sleeve 82. The rod 178 is in axial alignment with a rod 99 to which it is rigidly coupled. The rod 99 has, at the lower end thereof, a section 179, of reduced diameter, passing through the eccentric 98 and received within a bore 181, in the crank rod 178, wherein the section is secured preferably by brazing. A shoulder 182 being provided by the section 179, the eccentric is rigidly clamped between said shoulder and the extremity of the crank rod 178. The rod 99 extends through an aperture 184 in the cover 114 of the ejector head and thereabove is surmounted by a button or handle 186 conveniently attached to the rod, preferably by friction. Normally, the rod 99 is sustained in the raised position, as indicated, (Fig. 18) by a compression spring 187 disposed about a hub 188 of the handle 186 between the lower side thereof and the cover 114, a washer 189 also being preferably employed between the spring and cover. From the lever 161 an arm 191 extends to a point immediately below the rod 178 and in operative proximity thereto so that when the handle 186 is manually depressed, against the resistance of spring 187, the consequent motion of rod 178 is communicated to the lever 161 which is rocked about its axis thereby disengaging finger 171 from the pin 169 on cam 142 so that spring 156 can initiate driving relationship between the hub 21 of the turntable and the friction wheel 119 resulting in a cycle of operation of the cam 142. When pressure in a downward direction is removed from the handle 186 the spring 187 immediately raises the crank rod 178 upwardly to its normal position; also, the spring 174 simultaneously returns finger 171 to its normal position wherein it is adapted to obstruct rotation of cam 142 when pin 169 is carried to the finger 171.

Means is also provided to automatically rock the lever 161. This is effcted when the pickup arm 6 reaches the eccentric groove at the end of the sound groove. The means alluded to comprises a spider 193 (Fig. 19) rigidly attached to the shaft 43, and consequently adapted to swing horizontally with the pickup arm. The spider 193 includes a pawl arm 194 having at the swingable end thereof a pair of fingers 196 and 197 extending downwardly. Pivoted to the finger 197, by a rivet 198, is a pawl 199 while a tension spring 201, anchored to the finger 196 and pawl, normally retains a point or edge 202 of the pawl in a downward position; that is, in a position wherein the edge 202 is directly below the axis of the rivet 198. As the stylus of the pickup arm 6 enters the eccentric groove of a record on the turntable 3 the pawl 199 engages a ratchet plate 203 carried by the pivoted member 161 and having a series of ratchet teeth 204 disposed substantially radially of the tubular shaft 43. The plate 203 is carried at such a level with respect to the pawl 199, when the lever 161 is in its normal position, that initial engagement of the pawl 199 by the plate 203 is adequate to swing the pawl about its axis against the resistance of spring 201 from its normal position (Fig. 17) to the position indicated in Figure 19 as the pickup arm is moved inwardly by the eccentric groove on the record just reproduced. The eccentric groove then swings the pickup arm outwardly which is, of course, accompanied by movement of the pawl arm 194 in the opposite direction. But the edge 202 of the pawl being adapted to be caught by the teeth 204 of the ratchet, said ratchet receives a downward moment of force from the pawl which is adequate to rock lever 161 about its pivotal axis and disengage finger 171 from the pin 169 thereby giving rise to a cycle of operation of cam 142. As soon as the cycle just referred to has been initiated the pawl is swung out of engagement with the ratchet by mechanism to be described hereinafter.

Provision is made for adjusting the position of the plate 203 vertically so that it is adapted to be operatively engaged by the pawl 199. To this end, the plate 203 is provided with a slot or aperture 205 only large enough and of formation to accommodate a lug 206 struck downwardly from the lever 161; also, a second lug 207 struck downwardly from the lever 161 is received within a notch 208 at one end of the plate 203. The plate 203 is thus adapted to be guided by the lugs which secure it against edgewise displacement. A screw 209 passes through plate 203, between the lugs, through the lever 161 and is threaded in the trigger arm 191. The plate 203 is thus adapted to be drawn toward lever 161 but is yieldably resisted by resilient means which may appropriately take the form of one or more spring washers 211 on the screw 209 between plate 203 and the pivotal member 161. To overcome a tendency of the arm 191 to swing about screw 209 said arm is formed with a projection provided by striking a dent 212 in the arm (Fig. 17) which is received in an indentation or hole 213 in the lever 161.

The operation of the motor is adapted to be controlled from the ejector head 9. This is effected by turning the button 186 appropriate rotation of which is adapted to start and stop the motor 29. This is made possible by means including a switch indicated in its entirety by the reference character 214. The switch is fixed to the wall 13 of the base plate by a bracket 216. A crank mechanism comprising the rod 178 and a crank arm 217, rigidly coupled thereto, is adapted to carry a switch pin 218, on arm 217, between a pair of fingers 219 of a bifurcated switch arm 221. Although the structure of the switch does not constitute a feature of the invention, a characteristic of the switch is that when its arm 221 is moved slightly beyond a mid position between its "on" and "off" extreme limits the switch arm snaps to the nearest extreme position. As the pin 218 is swung clockwise about the axis of shaft 178, the switch 214 as viewed in Fig. 16 is opened. When pin 218 is carried counterclockwise the switch is, of course, snapped to closed position.

Figure 20:
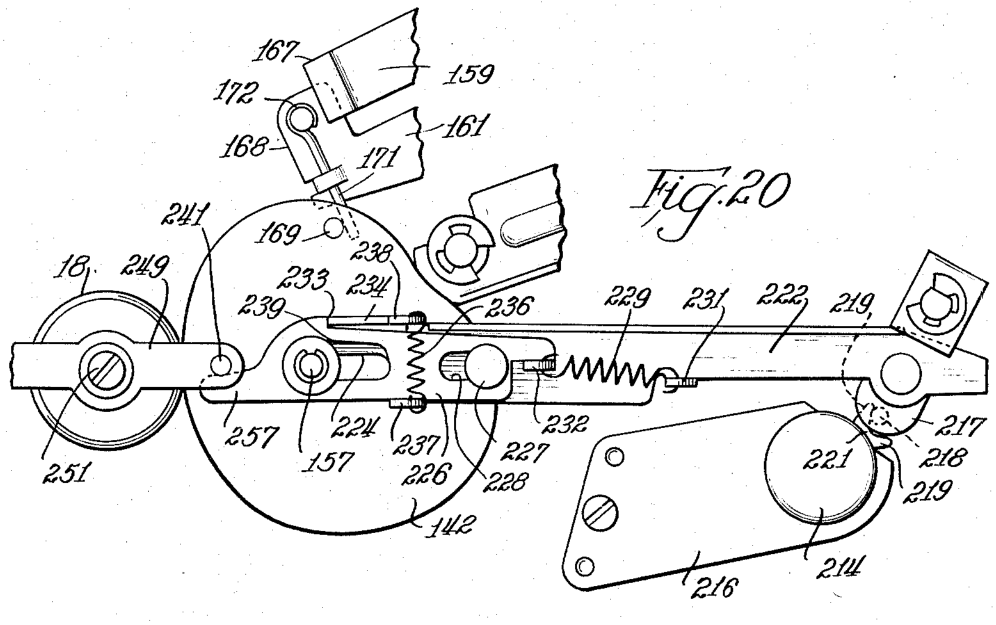
Fig. 20 is a diagrammatic bottom plan view of parts necessary to automatically stop operation of the machine after the last record has been played, some of the parts being broken away.

When the crank pin 157 is carried through its orbit by cyclic operation of the friction wheel 119 the ejector head 9 is actuated to deliver a record from the magazine to the turntable 3. This is made possible by a link 222 which is pivoted by a rivet 223 to the crank arm 217 while through a slot 224 (Fig. 20) in link 222 the crank pin 157 passes. It will therefore be noted that there is lost motion between the crank pin 157 and the crank mechanism including the arm 217. This enables the switch pin 218 to be moved to open and close switch 214 without disturbing the position of cam 142. During the cycle of motion the pin 157 strikes both ends of the slot 224 to move the link 222 and operatively rock the shafts 178, 82 and eccentric 98. Throughout the greater part of its cyclic orbit the crank pin 157 swings the switch pin 218 to and through points remote from the switch arm 221 so that the operation of the record player cannot be interrupted until a record changing cycle has been substantially completed. This prevents the motor from being turned off when the mechanism is in the change cycle and thus prevents it from being stopped with the rubber rim 121 in engagement with the hub, eliminating the possibility of the rubber taking a permanent set at such a point during long periods of disuse.

Figure 21:
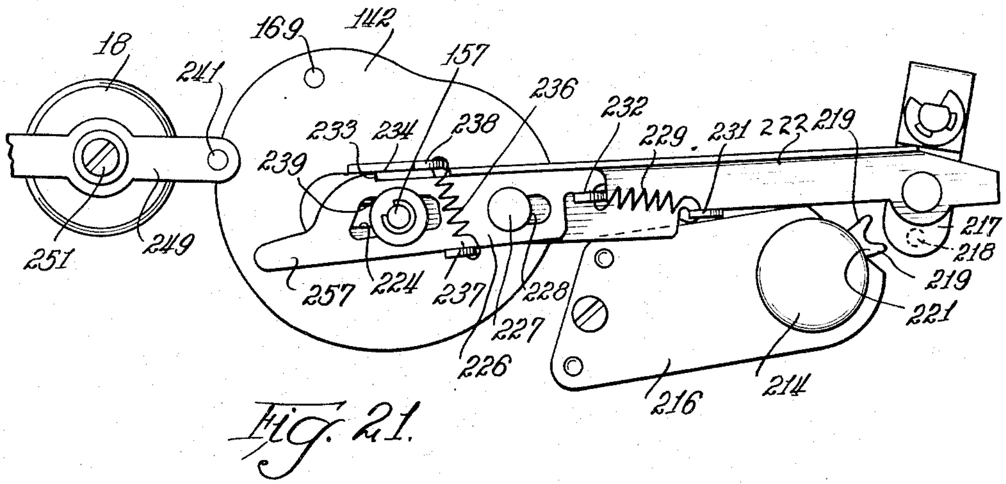
Fig. 21 is another view corresponding to the Fig. 19, the view showing the parts in a different position.

By the addition of means to vary the lost motion between the crank pin 157 and the crank arm 217, when the last of the records from the magazine has been reproduced, the cyclic motion of the crank pin 157 is adapted to open the switch 214. This is effected as follows: The link 222 carries a control link or latch link 226 (Fig. 20), which is slidably anchored thereto by a headed stud 227, carried by the link 222, and passing through a slot 228 in the control link 226. The control link 226 is urged toward the crank mechanism 217 by a tension spring 229 anchored between an ear 231, extending downwardly from the edge of link 222, and an ear 232, extending downwardly from the end of link 226. The link 226 is releasably restrained from displacement by the spring 229 by a hook portion 233, on link 226, adapted to extend over the edge of link 222 and engage a fin 234 struck downwardly from the link 222. Engagement of the hook portion 233 with the fin 234 is further secured by another tension spring 236 anchored transversely of the links between an ear 237, extending downwardly from the latch link 226, and an arm 238 of the fin 234. The crank pin 157 besides passing through slot 224 also extends through a slot 239 in the link 226. It will therefore be understood, on comparing Fig. 20 with Fig. 21, that when link 226 is displaced edgewise away from the fin 234 slightly and against the resistance of spring 236, the hook 233 is disengaged from fin 234 whereupon the control link is snapped from its latched position (Fig. 20) to its unlatched position (Fig. 21) by the force of spring 229, the extent of displacement of the latch link being determined by the slot 228 which is shorter than slots 224 or 239. When the link 226 is thus unlatched from the link 222 the slots 224 and 239 are in staggered relationship to each other thereby reducing the lost motion between crank pin 157 and the crank arm 217. Consequently, the crank pin, when carried through one of its cycles, is then able to swing the arm 217 of the crank mechanism through a wider arc than it is adapted to do when the latch link is in latched relationship to the link 222. Also, the increased swing of arm 217 is adequate to open switch 214 by moving the switch arm 221 to its Fig. 16 position by the pin 218 in connection with the crank mechanism.

Novel means is provided for unlatching the latch link 226 from link 222. Said means includes a movable stop member to engage the latch 226 when a final record from the magazine has been reproduced on the turntable. The movable stop member is shown particularly in Fig. 10 and referred to by the reference character 241. In order that the stop may be moved from a "raised" position, in which it is indicated by full lines, to a "down" position, in which it is indicated by broken lines, the spindle 4 is carried by the socket member 18 and adapted to be slid axially within the sleeve portion 22. In order that this may be carried into effect, the spindle includes opposed flat surfaces 246 (Fig. 22) which therefore provide shoulders 247. The surfaces 246 are engaged by complementary flat surfaces 244 at the base of the socket member 18 to restrain the spindle against turning movement. Downward movement of spindle 4 is limited by abutment of the shoulders 247 with shoulders 248 on the socket member 18. To provide a limitation against upward movement thereof, the spindle includes at its lower end a section 254 of reduced diameter which provides shoulders 253. A carrier bar 249 has an aperture 255 therein of formation registering with the conformation of section 254 on the spindle while a screw 251, threaded in the spindle, and washer 252 are adapted to clamp the bar against the shoulders 253. Rigidly mounted at one end thereof, the bar 249 carries the stop 241 while the opposite end of the bar is resiliently anchored to the wall 13 of the base plate by a tension spring 256.

When the spindle 4 is free of the weight of records, the force of the spring 256 is adequate to lift the spindle to its raised position wherein the bar 249 abuts the bottom end of the socket member 18. When, however, but a single record is placed on the shoulder 8 of the spindle the weight of the record is adequate to slide the spindle downward until the bar 249 and stop 241 occupy their down position. It is, therefore, obvious that the weight of one or more records resting on the spindle retains the stop 241 in its down position until all the records of the stack have been released to the turntable whereupon the spring 256 raises the stop. The latch link 226 includes a finger 257 extending outwardly beyond the adjacent end of link 222 and adapted to be swung over the stop 241 when said stop is in its lowered position. When, however, the stop 241 is in upward position, due to the absence of a record on the spindle, it is adapted to be engaged by the tip of the finger 257 which causes it to be swung about the pivot 227 thereby unlatching the latch link 226 from the link 222, and thereupon followed by opening of switch 214 as previously described.

The links 222 and 226 are adapted to be latched manually by turning the button 186 (Fig. 15) so as to rotate the crank mechanism counterclockwise (Fig. 16). This involves moving link 222 to the right against the resistance of spring 229, since the latch link 226 is held against movement (with link 222) by the crank pin 157, said crank pin being also stationary because finger 171 of the latch mechanism retains cam 142 against rotation. This operation stretches the spring 229 until the hook portion 233 is enabled to be snapped over the edge of fin 234 by the spring 236. This operation having been carried into effect, the machine is in readiness to receive another stack of records.

To start playing a group of unplayed records, all the records of the group are placed on the spindle, the motor is then started by turning the handle 186 to close switch 214, and the handle depressed to start the mechanism in cycle and release a record from the magazine to the turntable, after which, the machine will automatically play all the records and then automatically stop.

Figures 23, 24:
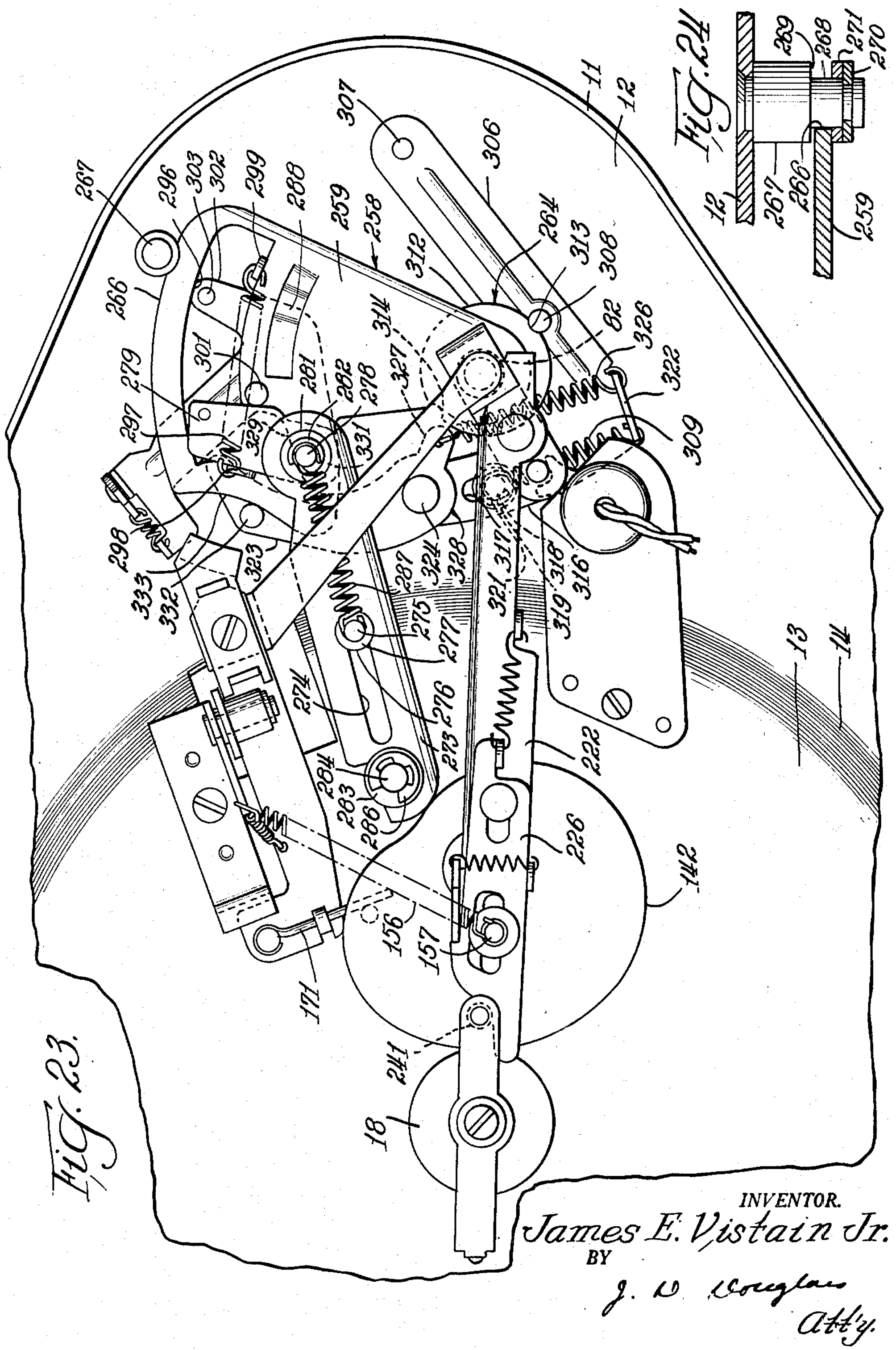
Fig. 23 is a fragmentary bottom plan view of the invention showing mechanism thereof more in detail.
Fig. 24 is a view of the support stud, in elevation, and fragmentary portions of parts, in cooperation with the stud, in section.

The pickup arm is adapted to be removed from engagement with a record on the turntable and swung to a point beside the turntable by means including a swing-out mechanism indicated in its entirety by the reference character 258 (Fig. 23). The swing-out mechanism includes a control plate 259 of generally triangular formation having a hub 261 (Fig. 18) and a bore 260 therein through which the sleeve 82 is in extension and about which the swing-out mechanism is adapted to be swung freely. The swing-out mechanism is confined against displacement axially of the sleeve 82 (Fig. 18) by a conventional U-shaped washer 262, in an annular groove 263 around the sleeve below the hub 261 and an eccentric member 264, later to be described, pinned to the sleeve above the swing-out mechanism. Furthermore, the control plate 259 includes an edge 266 (Fig. 23), which is arcuate of the sleeve 82, and which is supported additionally as follows: Rigidly mounted on the base plate 2 is a support stud 267 which has a section 268 (Fig. 24) of reduced diameter extending opposite the edge 266 of the actuator arm. A washer 271 is carried on the section 268, being retained on the section 268 by a conventional U-shaped washer 270 disposed in a groove adjacent the end of the stud. The edge 266 of the plate 259 extends into the space between the washer 271 and the shoulder 269 on the stud and rests on the washer 271.

The swing-out mechanism 258 is adapted to be swung about the sleeve 82 (Figs. 15 and 23) by the rotary cam 142, cyclic motion of which is adapted to be communicated to the swing-out mechanism by means of a follower mechanism 272. In detail, the follower mechanism 272 comprises a follower link 273 having a slot 274, extending longitudinally thereof, and in which is received a guide pin 275 supported by and extending downwardly from the wall 13. The link 273 is slidable on the pin 275 and is anchored thereto by means including a washer 276 and U-shaped washer 277 disposed in a groove adjacent the end of the pin. At its right hand end, the link 273 is pivotally secured to the control plate by a pin 278 carried by said plate. A safety arm 279, later to be described, and sandwiched between the link 273 and control plate 259, is also adapted to pivot about pin 278, a washer 281 and U-shaped washer 282 being on pin 278 to prevent release of the link 273 and arm 279 from the pin. On its left hand end the link 273 carries a follower 283 rotatable on a pin 284 extending downwardly from the link 273, the follower 283 being retained on the pin preferably by a U-shaped washer 286. The swing-out mechanism is biased counterclockwise (Fig. 23) about the sleeve by a tension spring 287 anchored between the pins 275 and 278 but limited in its movement by engagement of the pin 275 and the right hand end of the slot 274. This is the position which the swing-out mechanism occupies during reproduction of a record and which will be hereinafter referred to as its "inward" position. Also while the swing-out mechanism is in its inward position, the follower 283 occupies a position adjacent to but spaced slightly from the rotary cam 142 when held in a stationary position by the finger 171 of the trigger mechanism. As cam 142 rotates through a cycle, however, it swings the swingout mechanism clockwise or "outwardly" from its inward position, by pressure of its surface against the follower 283.

Mechanism including a lift cam 288 is provided on the control plate to rock the pickup arm 6 vertically. Said lift cam includes a dwell section provided by a depression 289, arcuate of the sleeve 82, in the plate 259 of the swing-out mechanism. When the swing-out mechanism is in its inward position a lift rod 291 (Fig. 15) journalled in the tubular shaft 43, rests against the dwell 289. The lift rod extends throughout the length of the shaft 43 above which it bears in rigid connection therewith, a laterally extending arm 292 (Figs. 3 and 15) through the swingable end of which is threaded an adjustment screw 293 adapted to engage the bracket member 63. If desired, a helical spring 294 may be coiled about screw 293 between the bracket member 63 and arm 292 to hold the screw in its adjusted position. By turning screw 293 the elevation of the free end of the pickup arm is adapted to be regulated. The arm 292 is in close proximity to one of the arms 54 (Fig. 6) at one edge thereof, while in close proximity to the opposite edge is an arm 295, integral with the arm 292. Since the lift cam 288 thus partly supports the weight of the pickup arm it follows that swinging of the swing-out mechanism is accompanied by the dwell 289 of the lift cam moving out from under the lift rod 291 so that it is moved axially upward thereby rocking the pickup arm upwardly about the pivotal members 61.

After the pickup arm has been rocked upwardly by the lift cam 288, the swing-out mechanism engages the spider mechanism to swing the pickup arm outwardly. Mechanism to carry this into effect includes the safety arm 279 (Fig. 23). It extends over an aperture 296, arcuate about the sleeve 82, in the control plate 259. The safety arm 279 is biased clockwise about the pin 278 by a tension spring 297 anchored between an oar 298 struck downwardly from arm 279 and an ear 299 struck downwardly from the plate 259. Rotation of the arm 279, in a clockwise direction, is limited, however, by a pin 301 on the control plate 259. The spider mechanism, Fig. 19, includes an arm 302 carrying at its free end a follower 303 extending into the aperture 296 and adapted to be engaged by the safety arm 279 as the swing-out mechanism is swung outwardly to move the pickup arm and make way for transfer of an unplayed record from the magazine to the turntable.

As will now be understood, should outward movement of the pickup arm be forcibly resisted, such as by a child, or should the pickup arm be forced inwardly about its axis after being carried to some point remote from its extreme inward position, then the safety arm 279 is merely swung away from the stop pin 301 against the resistance of spring 297 and no part of the record player will be deformed or broken.

Figure 25:
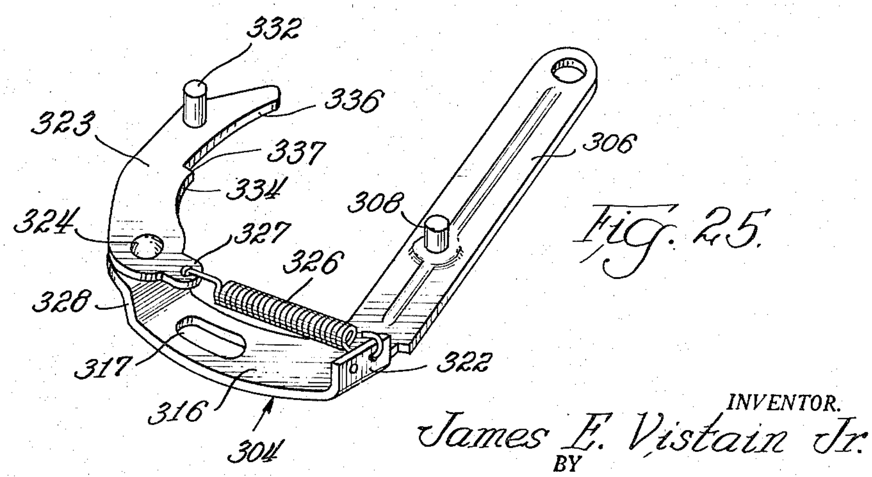
Fig. 25 is a view of the positioning mechanism, in perspective.

Although means to resiliently urge the pickup arm in one direction has just been described, additional means to yieldably carry the pickup arm in the opposite direction is also provided. It includes a positioning mechanism indicated in its entirety by the reference character 304 (Fig. 25). In detail, it includes a substantially L-shaped positioning arm 306 which is operably pivoted, at one end thereof, to the base plate 12 by a stud 307 (Fig. 23). The arm 306 extends past the sleeve 82 and carries a pin 308 which extends downwardly, from said arm, and is adapted to be pressed into engagement with the eccentric member 264 by a tension spring 309. More specifically, the eccentric member 264 includes a hub portion 311 (Fig. 18) from the periphery of which an eccentric flange 312 extends. In the peripheral surface of the flange at a point farthest from the axis of the sleeve 82 is a notch 313 while diametrically opposite thereto is another notch 314. The pin 308 is adapted to be pressed into one of the notches 313 or 314 and since the hub 311 is secured to the sleeve 82, the ejector head 9 is maintained in whichever position it is turned to thus provide support for the two sizes of records the machine is capacitated to reproduce. The notches 313 and 314 being comparatively shallow, the ejector head may readily be turned manually to cam the pin 308 against the force of spring 309 out of the notches. As one mode of anchoring the spring 309 to bias the pin 308 toward the eccentric member 264, a lateral extension 316 of the arm 306 is provided with a slot 317, arcuate of the pin 307, and through which a pin 318 is in downward extension from the base plate 12. If desired, means such as a washer 319 and U-shaped washer 321 may be applied to the pin 318 to additionally support the arm 306 against downward displacement. A stationary support for one end of the spring 309 is thus provided by the pin 318 while the remaining end of said spring is attached to a flange 322 bent downwardly from the arm 306.

The tone arm positioning mechanism also includes a set down dog 323 which is substantially arcuate in formation and is pivotally connected at one end to the free end of the lateral extension 316 of the positioning arm by a rivet 324 The dog 323 is urged toward a normal position indicated in Fig. 25 by a tension spring 326 anchored between the flange 322 and an ear 327 of the positioning dog, the normal formation of the positioning mechanism being substantially U-shaped due to the location of ear 327 and the tension of spring 326. In order that the ear 327 may be adapted to swing, without interference, under the free end of pin 318, the extension 316 is offset at 328.

For the purpose later to be indicated, the spider mechanism 193 includes a third arm 329, the free end of which carries a downwardly extending pin or follower 331 which is, during a record changing cycle, adapted to be in engagement with the positioning dog 323. Partly to provide freedom for movement of the spider 193 during record playing, however, the dog 323 includes a pin 332 which extends into the plane through which the arm 259 of the swing-out mechanism is adapted to swing. The plate 259 also includes a cam surface 333 adapted to engage the pin 332 to hold the positioning dog 323 away from the orbit that the pin 331 on the spider 193, is carried through during inward movement of the pickup arm when a record is being played.

As previously indicated, the swing-out mechanism is first turned clockwise, Fig. 23, during a record changing cycle and in this operation the safety arm 279 is carried into engagement with the pin 303 on the spider mechanism and swings the pickup arm outwardly. At the same time, the positioning dog 323, since the cam surface 333 is moved away from the pin 332, is swung nearer to the spider mechanism, by the spring 326. Rotation of the spider mechanism carries the pin 331 into engagement with the positioning dog. In so doing, the pin 331 first engages a curvilinear side portion 334 over which it slides as the dog 323 is thereby swung away from the spider mechanism. The pin then passes on to a cam portion 336 which extends from a positioning surface or heel 337 to the free end of the positioning dog. In the course of its passage over the surfaces 334 and 336 the pin 331 of the spider mechanism 193, and consequently the pickup arm, is yieldably held in movement in both directions being controlled by both the swing-out mechanism (279) and the positioning mechanism (323) for the greater part of their movement. After the record is dropped and the swing-out mechanism returns toward its inner position, the pressure exerted by the cam portion 336 against pin 331 swings the spider mechanism inwardly. The pickup arm is, of course, simultaneously swung inwardly, the pin 331 sliding along the surface 336 of the positioning dog 325, until the pin 331 engages the heel 337 which stops the sliding action of said pin over the cam portion 336. This holding cooperation of the heel 337 with pin 331 provides the "let-down" position for the pickup arm. When in its let-down position the needle of the pickup arm is directly over the beginning of the sound groove of a record when supported by the turntable. While the pickup arm is thus detained in its let-down position, the dwell portion 289 of the let-down cam is carried under the lift rod 291 thereby enabling the pickup arm to be lowered into engagement with the record to be reproduced. Also at substantially the same time that the pickup arm engages the record, the cam surface 333 of the swing-out mechanism, which is being moved counterclockwise, as viewed in Fig. 23, engages the pin 332 on the positioning dog, after which the remaining motion of the swing-out mechanism inwardly, swings the positioning dog out of engagement with pin 331 freeing the spider mechanism which may now be rotated, without interference, by the pickup arm as it is carried across a record by the sound grooves thereon.

As previously indicated, provision is made to releasably secure the ejector head 9 in whichever position it is turned by means of the spring-pressed pin 308 and the notched eccentric member 264. Owing to the difference in spacing of the notches 313 and 314 from the axis about which the eccentric member 264 is rotatable, the position of the arm 306 and consequently of the heel 337 (Figs. 23 and 25) is changed whenever the position of the ejector head is shifted between 10-inch record capacity and 12-inch record capacity. This effectively compensates for the difference between the position of the beginning of the sound groove of a 10-inch record and a 12-inch record so that whenever the ejector head is adjusted to support a stack of 10-inch records the pickup arm will be lowered at a point where the beginning of the sound groove of a record of this size occurs when supported by the turntable; also when the ejector head is turned from the 10-inch record position to a position in which it is adapted to support a stack of 12-inch records then the pickup arm is similarly lowered into engagement with the beginning of the sound groove of a 12-inch record when it is supported by the turntable.

Having thus described my invention in an embodiment thereof, I am aware that numerous and extensive departures may be made therefrom without departing from the spirit or scope of the appended claims.

I claim:

1. In a phonograph record player having a base plate and coupled thereto a driven turntable and a magazine provided by means including an ejector mechanism to provide support for records at their peripheral edges, means to operate said ejector head from said turntable including a hub on said turntable, clutch means including a mutilated friction wheel including a notch at the periphery thereof, means to slidably anchor said wheel to said base plate, resilient means on said base plate to urge said friction wheel into driving relationship with said hub, a spring anchored to said base plate, means rigidly coupled to said wheel by which said spring is also anchored to said friction wheel eccentric to the axis thereof to swing said notch past said hub, a stop member rigidly coupled to said friction wheel, a trigger mechanism carried by said base plate to engage said stop and thereby retain said wheel against rotation by said spring during record playing, said notch being adjacent said hub when said stop is engaged by said trigger mechanism, a crank pin rigidly coupled to said wheel eccentric to the axis thereof also by said last named means, a crank mechanism operably coupled to said ejector mechanism, means providing for manual rejection of a record including means connected to the crank mechanism for axial movement thereof manually from a point adjacent said ejector mechanism, axial movement of said crank mechanism being disposed for engagement with said trigger mechanism and arranged to move said trigger mechanism to thereby release said friction wheel into driving communication with said hub, means including a link to communicate motion from said crank pin to said crank mechanism for operation of said ejector mechanism.

2. In a phonograph record player having a base plate and coupled thereto a driven turntable and a magazine provided by means including an ejector mechanism to support records at their peripheral edges, means to operate said ejector head from said turntable, comprising clutch means including a driver member in driving connection with said turntable, said clutch means also including a mutilated friction wheel having a notch at the periphery thereof, said wheel being coupled to said base plate, a spring, means in rigid connection with said wheel including a crank pin by which said spring is coupled to said wheel eccentric to the axis thereof, said spring being adapted to swing said wheel until the notch thereof is past said driver member and into driving communication with said driver member, a stop member in rigid association with said friction wheel, a trigger mechanism including a pivoted member supported from said base plate, resilient means to bias said pivoted member to a position in which it is adapted to be engaged by said stop thereby providing for positioning said wheel with the notch thereof adjacent said driver member when a record is being reproduced, means to manually rock said pivoted member against the resistance of said resilient member comprising a crank mechanism operably coupled to said ejector mechanism, means in connection with said ejector mechanism for axially moving said crank mechanism, an arm on said pivoted member extending to said crank mechanism, means in connection with said crank mechanism by which it is adapted to be axially moved manually from a point above said base plate to rock said pivoted member out of engagement with said stop, a link coupled to said crank pin and said crank mechanism to operate said ejector head on rotation of said friction wheel, and mechanism adapted to cooperate with said pivoted member when playing of a record has been completed to automatically rock said pivoted member.

3. In a phonograph record player having a base plate and coupled thereto a driven turntable, a pickup arm, and a magazine provided by means including an ejector mechanism to provide support for records at their peripheral edges, means to initiate sequential operation of said ejector mechanism from said turntable including a trigger mechanism including a pivotal member pivoted to said base plate, clutch means including a driver member drivingly coupled to said turntable, said clutch means also including a drivable member supported from said base plate, a rotary cam in driving communication with said drivable member, a stop pin on said cam, resilient means coupled to said base plate and adapted to bias said drivable member toward driving engagement with said driver member, a spring anchored to said pivotal member to bias said pivotal member toward engagement with said stop pin, said drivable member being adapted to be held out of driving communication with said driver member when said stop pin is engaged by said pivotal member, means to automatically provide for driving communication between said clutch elements including ratchet teeth on said pivoted member, means coupled to said pickup arm for swinging motion therewith including a pawl adapted to engage said ratchet teeth when said pickup arm reaches the eccentric terminal groove of a record, swinging motion of said pawl being adapted to rock said pivoted member and thereby release said stop pin from engagement by said pivoted member, means coupled to said base plate including a follower adapted to be engaged by said rotary cam to swing said pickup arm out of engagement with said record, means to manually provide for driving communication between said clutch elements including a crank mechanism connected to said ejector mechanism, means in connection with said ejector mechanism providing for axial movement of said crank mechanism, means in connection with said crank mechanism by which it is adapted to be moved manually from a point adjacent said ejector mechanism, an arm extending from said pivoted member and adapted to be engaged by said crank mechanism when moved axially to thereby rock said pivoted member and provide driving relationship between said clutch elements, a crank pin eccentric to the axis of said drivable member and drivingly coupled thereto, and means including a link coupled to said pin and said crank mechanism to convey motion of said crank pin to said crank mechanism for operation of said ejector mechanism.

4. The combination with a phonograph record player having a magazine including an ejector mechanism to provide support for a group of records at their peripheral edges and a drive motor from which the ejector mechanism is adapted to be cyclically operated, of means including a crank mechanism by which said ejector mechanism is adapted to be operated and by which the operation of said record player is adapted to be controlled comprising clutch means including a driver element in rigid association with said turntable, a drivable element in association with said driver element, trigger mechanism to provide an interruption in the driving communication between said driver and said drivable elements during record playing, means in connection with said ejector mechanism providing for axial movement of said crank mechanism manually from a point adjacent said ejector mechanism, said crank mechanism when moved axially providing for operation of said trigger mechanism and consequent cyclical driving operation of said drivable member, means including a link in operative communication with said drivable member and said crank mechanism to translate rotary motion of said drivable member into rocking motion of said crank mechanism for operation of said ejector mechanism, a switch in circuit with said motor, and means in connection with said link providing lost motion between said pin and said crank mechanism so that said switch is adapted to be opened and closed by manual operation of said crank mechanism to thereby stop the operation of the record player.

5. In a phonograph record player having a base plate and coupled thereto a motor and driven thereby a turntable and a magazine provided by means including an ejector mechanism to provide support for records at their peripheral edges, means including a crank mechanism by which said ejector head is adapted to be operated and by which the operation of said record player is adapted to be controlled, clutch means including a hub on said turntable, a mutilated friction wheel including a notch at the periphery thereof, said wheel being anchored to said base plate and adapted to drivingly cooperate with the hub of said turntable, a crank pin rigidly coupled to said wheel, a spring anchored to said pin and said frame to bias said notch past said hub, a stop member permanently in driving communication with said wheel, a trigger mechanism including a pivotal member, means connected to said base plate by which said pivotal member is supported, resilient means to bias said pivotal member into stop engaging position, said wheel being thereby held with the notch thereof adjacent said turntable hub during record playing, means providing for axial movement of said crank mechanism to manually engage and rock said pivotal member thereby freeing said friction wheel for driving engagement with said hub, a switch carried by said base plate, a link in operative communication with said crank pin and said crank mechanism and means in connection with said link providing lost motion between said crank pin and said crank mechanism said lost motion providing for rocking of said crank mechanism to operate said ejector head when said friction wheel is driven and also providing for opening and closing of said switch by said crank mechanism when rocked manually.

6. The combination with a phonograph record player having a magazine including an ejector mechanism to provide support for a group of records at their peripheral edges and a drive motor by which the ejector mechanism is adapted to be cyclically operated, of means to stop the operation of said record player when a last record has been played comprising a switch to govern the operation of said motor, a manually operable crank mechanism in connection with said ejector mechanism head through the agency of which said switch is adapted to be opened and closed from a point adjacent said ejector mechanism, a crank pin, means drivingly coupled to said motor to carry said crank pin through a cycle of motion when a record has been played, a pair of members coupled to said crank pin, one of said members also being coupled to said crank mechanism, means in connection with said members to provide a maximum and a minimum of lost motion between said crank pin and said crank mechanism thereby providing first and second operative lengths for said pair of members, said first operative length providing for operation of said ejector means in response to motion of said crank pin, said second operative length providing for opening of said switch in response to motion of said crank pin, shiftable means including a stop member in association with said pair of members by which the operative length thereof is adapted to be varied, said stop member being adapted to be shifted to a remote position by the weight of a record in said magazine, and means in communication with said stop member to shift said stop member to a stop position when said magazine has been freed of a final record by said ejector means, one of said pair of members when moved by said crank pin being adapted to be displaced with respect to the other one of said pair of members by said stop member when it is in stop position to provide a second operative length for said pair of members, said displaced member being adapted to be returned to its former position with respect to the other one of said pair of members by movement of said crank mechanism to close said switch.

7. In a phonograph record player having a base plate and thereon a turntable and an electromotive unit to drive said turntable, a magazine in which a stack of records are sustained in elevated position above said turntable, said magazine being provided by means including an ejector head to provide support for records at their peripheral edges, in combination, means to stop the operation of said electromotive unit after the last record from said magazine has been played on said turntable comprising a switch on said base plate to govern the operation of said electromotive unit, a crank mechanism operatively associated with said ejector head adapted to open and close said switch manually, clutch means including a member cyclically driven by said electromotive unit when a record is rejected, a crank pin rigidly connected to said member, means including a pair of links to couple said crank mechanism to said crank pin, means in connection with said links providing for lost motion between said crank pin and said crank mechanism, means in connection with said links by which a maximum of lost motion is provided by said links when in latched relationship to each other and a minimum of lost motion being provided when said links are in unlatched relationship to each other, said links being adapted to be latched by manually turning said crank mechanism, said crank pin being adapted to operate said ejector head when said links are in latched engagement with each other, and means including a shiftable member adapted to be shifted to a predetermined position when the last record has been dislodged from said magazine, said shiftable member when in said predetermined position being adapted to unlatch said links from each other thereby providing for operation of said crank mechanism by said crank pin to a different degree to open said switch.

8. In a phonograph record player having a base plate and thereon a turntable and an electromotive unit to drive said turntable, a magazine in which a stack of records are sustained in elevated position above said turntable, said magazine being provided by means including an ejector head to provide support for records at their peripheral edges, in combination, means to stop the operation of said electromotive unit after the last record from said magazine has been played on said turntable, comprising a switch on said base plate to govern the operation of said electromotive unit, a crank mechanism operatively associated with said ejector head by which said switch is adapted to be opened and closed manually, clutch means including a member cyclically driven by said electromotive unit when a record is rejected, a crank pin rigidly connected to said member, means including a pair of links to couple said crank mechanism to said crank pin, means in connection with said links providing for lost motion between said crank pin and said crank mechanism, latch means in connection with said links by which said lost motion is variable, a maximum of lost motion being provided by said links when said links are in latched engagement with each other, a minimum of lost motion being provided by said links when said links are in unlatched relationship to each other, said maximum of lost motion providing for operation of said ejector head when said crank pin is carried through a cycle of motion, a shiftable member adapted to occupy a predetermined first position by the weight of a record in said magazine, means in connection with said base plate adapted to move said shiftable member to a second position when the last record has been dislodged from said magazine, said links being adapted to be unlatched from each other by said shiftable member when in its second position, said minimum lost motion then providing for opening of said switch in response to rotation of said crank mechanism by said crank pin.

9. In a phonograph record player having a base plate and thereon a turntable and an electromotive unit to drive said turntable, a magazine in which a stack of records are sustained in elevated position above said turntable, said magazine being provided by means including an ejector head for support of the records at their edges, in combination, means to stop the operation of said electromotive unit after the last record from said magazine has been played on said turntable, comprising a switch on said base plate to govern the operation of said electromotive unit, an ejector shaft operatively associated with said ejector head, an arm in connection with said shaft by which said switch is opened and closed by manually moving said shaft, a pair of links, means by which said links are slidably anchored to each other, one of said links being pivoted to said arm, latch means in connection with said links, spring means in connection with said links to provide latched engagement therebetween, a crank pin, drivable means in connection with said base plate by which said pin is carried cyclically through a predetermined course, means in connection with said turntable by which said pin is drivingly coupled to said electromotive unit when a record is rejected, means providing a slot in each of said links to receive said crank pin, one of said slots being opposite the other slot when said links are latched to each other thereby providing for a maximum of lost motion between said pin and said links, movement of said pin being adapted to operate said ejector head by said links with said maximum of lost motion, a mobile stop member, means connected to said stop member adapted to move said member to a first position by the weight of a record in said magazine, means coupled to said base plate adapted to move said member to a second position when the last record has been released from said magazine, said stop member being clear of engagement by said links when in said first position but adapted to unlatch one of said links from the other link when in said second position thereby providing for shifting of one of said links with respect to the other link to decrease the lost motion between said crank pin and said links, said decrease in lost motion providing for a greater motion of said arm, said increased arm motion being adapted to operate said switch.

10. In a phonograph record player of the class in which a base plate for support of a motor and driven thereby a turntable and for support of a group of records in elevated position above the turntable a magazine provided by a vertical spindle centrally of the turntable and having a shoulder thereon for support of the records at their center holes and an ejector mechanism for support of the records at their peripheral edges, means to stop the operation of said record player when a final record has been played comprising a switch in circuit with said motor, a crank mechanism in connection with said ejector mechanism, a crank pin, means drivingly coupled to said motor to cyclically carry said crank pin through a cycle of motion after a record has been played, links means coupled to said crank pin and said crank mechanism, means in connection with said link means providing a maximum of lost motion between said crank pin and said crank mechanism, said maximum of lost motion providing for one effective length of said link means, said lost motion being adapted to be varied to a minimum to provide another effective length to said link means, means to provide for a variation of the lost motion in said link means including a mobile stop member, means by which said mobile stop is rigidly coupled to said spindle, means in connection with said base plate providing for axial motion of said spindle, a spring to bias said spindle toward an upward position, the weight of a record on the shoulder of said spindle being adapted to displace said spindle to a downward position wherein said link means is free to be swung past said stop by said crank pin when carried through a cycle of motion, said cycle of motion of said pin providing for operation of said ejector mechanism by rocking said crank mechanism, said mobile stop being adapted to be carried to its upward position when the last record in said magazine has been released therefrom, said mobile stop when in its upward position being adapted to be engaged by said link means whereby lost motion of said link means is adapted to be varied to provide the other effective length of said link means to provide for automatic opening of said switch by said crank mechanism when actuated by cyclic operation of said crank pin.

11. In an automatic record player having a base plate and carried thereby a bearing member and an electromotive unit, magazine mechanism including a sleeve journaled in said bearing member, a record carrier member, means by which said carrier member is rigidly supported eccentrically of its ends from one end of said sleeve, said carrier member being adapted to be manually turned to either of two predetermined positions, means including a notched member fixed to said sleeve to releasably secure said carrier member in either of the predetermined positions to which it is adapted to be turned, and a positioning member beside said sleeve in pivotal relationship to said base plate, spring means to bias said positioning member into cooperative relationship with said notched member, one of the ends of said carrier member being adapted to provide support for a stack of small sized records at their peripheral edges when in one of said predetermined positions and the other of the ends of said carrier member being adapted to provide similar support for a stack of large sized records when said carrier member is turned to the other of said predetermined positions, a crank mechanism including a shaft journaled in said sleeve, a push plate, means by which said push plate is slidably anchored to said carrier member, mechanism connected to said base plate adapted to be cyclically operated from said electromotive unit to rock said crank mechanism, means including a swingable member fixed to said crank mechanism by which said push plate is adapted to dislodge a record from said carrier member when said crank mechanism is rotated, a switch in circuit with said electromotive unit, means providing for manual movement of said crank mechanism from a point adjacent said push plate for control of said switch, and means for axially moving said crank mechanism, operation of said cyclically operative mechanism being initiated by manually moving said crank mechanism axially.

12. In a phonograph record changer having a base plate, a driven turntable mounted on said base, a pickup arm, a magazine for holding unplayed records above the turntable including ejector means, cyclically driven operating means driven by said turntable, and trigger means adapted to keep said operating means out of driving relationship with said turntable; means for manipulating said pickup arm comprising a support for said pickup arm including a bearing carried by said base plate, a shaft journalled in said bearing, spider mechanism fixed to said shaft, hinge means engaged between said shaft and said pickup arm to allow said arm to be rocked vertically, cam means driven by said operating means, a swingout mechanism pivotally mounted on said base plate adapted to be driven by said cam means, said swingout mechanism including a lift cam, means engaged between said lift cam and said pickup arm to rock said arm vertically, said cam means being formed to move said swing out mechanism outwardly during a first part and inwardly during a second part of the cyclical operation thereof by said operating means, said swing out mechanism being formed and positioned to engage said spider mechanism to swing said pickup arm outwardly after raising thereof by said lift cam, positioning mechanism movably mounted on said base plate engaging said spider mechanism, said positioning mechanism being adapted to move said spider mechanism and said pickup arm inwardly during said second part of said operation, said positioning mechanism being formed to stop the inward movement at any predetermined position of said pickup arm, and said lift cam being formed to lower said pickup arm as it is stopped in its predetermined position.

13. In a phonograph record changer having a base plate, a driven turntable mounted on said base, a pickup arm, a magazine for holding unplayed records above the turntable including ejector means, cyclically driven operating means driven by said turntable, and trigger means adapted to keep said operating means out of driving realtionship with said turntable; means for manipulating said pickup arm comprising a support for said pickup arm including a bearing carried by said base plate, a shaft journalled in said bearing, spider mechanism fixed to said shaft, means mounted on said spider mechanism adapted to engage said trigger mechanism to initiate a cycle of operation of said operating means, hinge means engaged between said shaft and said pickup arm to allow said arm to be rocked vertically, cam means driven by said operating means, a swingout mechanism pivotally mounted on said base plate adapted to be driven by said cam means, said swingout mechanism including a lift cam, means engaged between said lift cam and said pickup arm to rock said arm vertically, said cam means being formed to move said swing out mechanism outwardly during a first part and inwardly during a second part of the cyclical operation thereof by said operating means, said swing out mechanism being formed and positioned to engage said spider mechanism to swing said pickup arm outwardly after raising thereof by said lift cam, positioning mechanism movably mounted on said base plate engaging said spider mechanism, said positioning mechanism being adapted to move said spider mechanism and said pickup arm inwardly during said second part of said operation, said positioning mechanism being formed to stop the inward movement at any predetermined position of said pickup arm, and said lift cam being formed to lower said pickup arm as it is stopped in its predetermined position.

14. In a phonograph record changer having a base plate, a driven turntable mounted on said base plate and a pickup arm adjacent said turntable; cyclically driven operating means for manipulating said pickup arm comprising, a main cam adapted to be driven by said turntable, follower means resiliently biased toward said cam, swing out means pivoted to said base plate operably engaged by said follower means, said cam being formed to move said swingout means outwardly during a first part and inwardly during a second part of the cyclical operation, mounting means for said pickup arm including a bearing on said base plate, a shaft journalled in said bearing, said pickup arm being pivotally mounted on said shaft on a horizontal pivot axis, a lift rod journalled centrally of said shaft, a lift cam formed on said swingout means adapted to engage said rod to tilt said pickup arm vertically, spider means on said shaft, said swing out means being formed and positioned to engage said spider means to swing said pickup arm outwardly during said first part of the operation, positioning mechanism pivotally mounted on said base plate engaging said spider adapted to move said pickup arm inwardly during said second part of the cyclical operation, said positioning means being formed to stop the inward movement of said pickup arm at a predetermined position, said swing out mechanism being formed to engage said positioning means to release said pickup arm from said positioning means as said lift cam is moved to lower said pickup arm, to free said arm to track a record.

15. In a phonograph record changer having a base plate, a driven turntable mounted on said base plate and a pickup arm adjacent said turntable; cyclically driven operating means for manipulating said pickup arm comprising, a main cam adapted to be driven by said turntable, follower means resiliently biased toward said cam, swing out means pivoted to said base plate operably engaged by said follower means, said cam being formed to move said swingout means outwardly during a first part and inwardly during a second part of the cyclical operation, mounting means for said pickup arm including a bearing on said base plate, a shaft journalled in said bearing, said pickup arm being pivotally mounted on said shaft on a horizontal pivot axis, a lift rod journalled centrally of said shaft, a lift cam formed on said swingout means adapted to engage said rod to tilt said pickup arm vertically, spider means on said shaft, said swingout means being formed and positioned to engage said spider means to swing said pickup arm outwardly during said first part of the operation, positioning mechanism pivotally mounted on said base plate engaging said spider adapted to move said pickup arm inwardly during said second part of the cyclical operation, said positioning means being formed to stop the inward movement of said pickup arm at a predetermined position, said swing out mechanism being formed to engage said positioning means to release said pickup arm from said positioning means as said lift cam is moved to lower said pickup arm, to free said arm to track a record, holding means to hold said main cam out of driven relationship with said turntable, and ratchet means pivotally mounted on said spider adapted to release said holding means by reciprocatory action of said spider.

16. In a phonograph record player having a base plate, a driven turntable mounted on said base plate, ejector means adjacent said turntable adapted to support a stack of records at the edge thereof, and a pickup arm: means for operating said pickup arm cyclically comprising a main cam adapted to be driven intermittently by said turntable, swing out means operably connected to said cam, said cam being formed to move said swing out means in a first direction during a first part of its cycle and to return it during the latter part of the cycle, support means for said pickup arm including a shaft pivotally connected to said arm, lift means movably mounted in said shaft, a lift cam formed on said swing-out means, said lift means engaging said lift cam to tilt said pickup arm upward during said first part of the cycle and to lower it during the second part, spider means on said shaft adapted to be engaged by said swing out means to move said pickup arm outwardly during the first part of the cycle, positioning means pivotally mounted on said base plate, means on said spider means adapted to be engaged by said positioning means, resilient means connected to said positioning means to urge said positioning means into pressing engagement with said means on said spider, said positioning means being thereby adapted to return said pickup arm from its outer position as said swing out means is returned during said latter part of its cycle, stop means on said positioning means adapted to engage said means on the spider to stop the return of said pickup arm at any predetermined let-down location relative to said positioning means, and cam means operably connected to said ejector means and engaging said positioning means whereby a change of position of said ejector means is effective to move said positioning means to change the predetermined position at which said pickup arm is stopped by said stop means.

17. In a phonograph record changer having a base plate, a driven turntable mounted on said base plate, a pickup arm adjacent said turntable and ejector means adapted to support a stack of records at the outer edge above said turntable, operating means for said pickup arm comprising; a rotary cam adapted to be driven intermittently from said turntable, holding means pivotally mounted on said base plate in holding relation to said cam, a swing plate movably mounted on said base plate, follower means engaged between said cam and said swing plate, said cam being formed to cause said follower to move said swing plate in one direction during a first part of the cyclic motion of said cam, and to return it during a latter part of the cam motion, a safety arm pivotally mounted relative to said swing plate, spring means engaged between said safety arm and said swing plate to bias said arm to a normal position on said swing plate, support means for said pickup arm including a bearing mounted on said base plate, a shaft to which said pickup arm is pivotally connected journalled in said bearing, a lift rod journalled centrally in said shaft and adapted to engage said pickup arm, a lift cam formed in said swing plate adapted to engage said rod to lift said pickup arm during said first part of the cyclic motion and to lower said arm during the latter part of the motion, spider means on said shaft having one arm adapted to engage said safety arm during the swinging out of said swingout plate to move said pickup arm outwardly during said first part of the cycle of motion, said safety arm being adapted to be moved against the resistance of said spring means by sufficiently forcible interference with the free movement of said pickup arm, pawl means pivotally mounted on said spider means, ratchet means on said holding means, said pawl means being adapted to slide over said ratchet means as said pickup arm moves inwardly but to catch on said ratchet as said pickup arm moves outwardly, said outward movement being effective to rock said pawl, said rocking being effective to move said holding means about its pivot to release said cam to start said cycle of movement, positioning means for said pickup arm including a positioning arm pivotally mounted on said base plate, a let-down dog pivotally attached to said positioning arm, said dog being adapted to engage a part of said spider means, spring means to urge said dog into engagement with said spider means, said dog being formed to move said spider and said pickup arm inwardly during the latter part of said cycle of motion, said dog being formed with a shoulder adapted to be engaged by said part of said spider to stop the inward motion of said pickup arm at a predetermined location while said pickup arm is lowered by said lift cam, said swing out plate being formed to engage said dog as said pickup arm is lowered to release the stopping engagement between said shoulder and said spider, and cam means operably connected to said ejector means to shift the position of said positioning arm to set the location of said shoulder at a plurality of predetermined positions depending on the diameter of the record supported by said ejector means.

References Cited in the file of this patent

UNITED STATES PATENTS

| Number | Name | Date |
|---|---|---|
| 2,331,383 | Faulkner | Oct. 12, 1943 |
| 2,333,414 | De Tar | Nov. 2, 1943 |
| 2,351,972 | Johnson | June 20, 1944 |
| 2,352,331 | Leline | June 27, 1944 |
| 2,397,932 | Erwood et al. | Apr. 9, 1946 |
| 2,402,150 | Dale | June 18, 1946 |
| 2,434,033 | Cain | Jan. 6, 1948 |
| 2,435,264 | Ansar | Feb. 3, 1948 |
| 2,453,123 | Erwood | Nov. 9, 1948 |
| 2,457,106 | Pressley | Dec. 21, 1948 |
| 2,480,623 | Ballentine et al. | Aug. 30, 1949 |
| 2,488,260 | Ascoli | Nov. 15, 1949 |
| 2,509,811 | Dale | May 30, 1950 |
| 2,536,432 | Faulkner | Jan. 2, 1951 |
| 2,545,643 | Bender | Mar. 20, 1951 |
| 2,629,603 | Carson | Feb. 24, 1953 |
| 2,636,742 | Redfield | Apr. 28, 1953 |

FOREIGN PATENTS

| Number | Country | Date |
|---|---|---|
| 451,846 | Great Britain | Aug. 4, 1936 |